United States Patent [19]

Lamarche

[11] 4,347,717
[45] Sep. 7, 1982

[54] TWO-STAGE TORSIONAL VIBRATION DAMPER

[75] Inventor: Paul E. Lamarche, Utica, Mich.

[73] Assignee: Borg-Warner Corporation, Chicago, Ill.

[21] Appl. No.: 278,262

[22] Filed: Jun. 29, 1981

Related U.S. Application Data

[63] Continuation of Ser. No. 106,597, Dec. 26, 1979, abandoned.

[51] Int. Cl.³ ............................................. F16D 3/66
[52] U.S. Cl. .................................. 464/64; 192/106.1; 192/106.2
[58] Field of Search ............................ 64/27 C, 27 F; 192/106.1, 106.2

[56] References Cited

U.S. PATENT DOCUMENTS

| | | | |
|---|---|---|---|
| 2,149,887 | 3/1939 | Hickman | 64/27 C |
| 2,574,573 | 11/1951 | Libby | 64/27 C |
| 2,632,318 | 3/1953 | Meyer | 64/27 C |
| 2,995,909 | 8/1961 | Russey | 64/27 F |
| 3,138,011 | 6/1964 | Stromberg | 64/27 F |
| 3,327,820 | 6/1967 | Maurice | 64/27 C |
| 4,138,003 | 2/1979 | Malloy | 64/27 F |
| 4,139,995 | 2/1979 | Lamarche | 64/27 C |
| 4,188,805 | 2/1980 | Fall et al. | 64/27 F |
| 4,279,132 | 7/1981 | Lamarche | 64/27 C |
| 4,302,951 | 12/1981 | Fall et al. | 64/27 C |
| 4,304,107 | 12/1981 | Fall et al. | 64/27 C |

FOREIGN PATENT DOCUMENTS

| | | | |
|---|---|---|---|
| 1032601 | 6/1958 | Fed. Rep. of Germany | 64/27 C |
| 166939 | 7/1921 | United Kingdom | 64/27 C |
| 489011 | 10/1936 | United Kingdom . | |
| 614928 | 12/1948 | United Kingdom . | |

Primary Examiner—P. S. Lall
Attorney, Agent, or Firm—James A. Geppert

[57] ABSTRACT

A torsional vibration damper assembly to provide extended travel for the dampening effect which is achieved by the use of two concentric series of damper springs interconnected through a common housing or intermediate member. A driving plate has two or more drive tangs secured thereon, which tangs extend inwardly into the path of the outer circle of damping springs. One or more floating divider rings are journalled in the assembly and have ears projecting into the path of the springs as do outer drive straps of the intermediate member. Floating wedges or skates are located between the springs of the inner circle along with inner drive straps of the intermediate member and hub arms in the path of the inner springs; the hub being driven through the circles of springs to drive a transmission input shaft.

20 Claims, 24 Drawing Figures

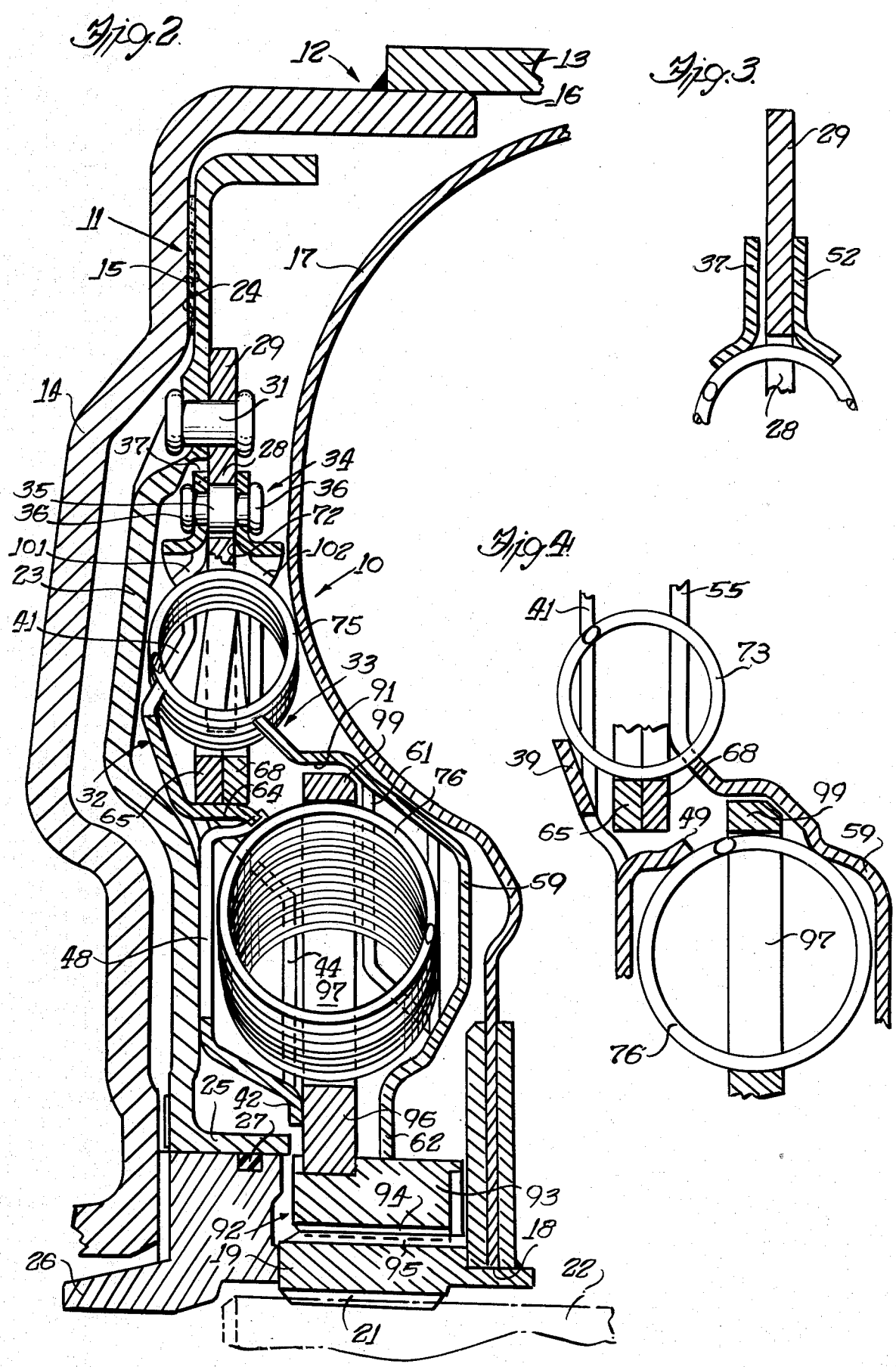

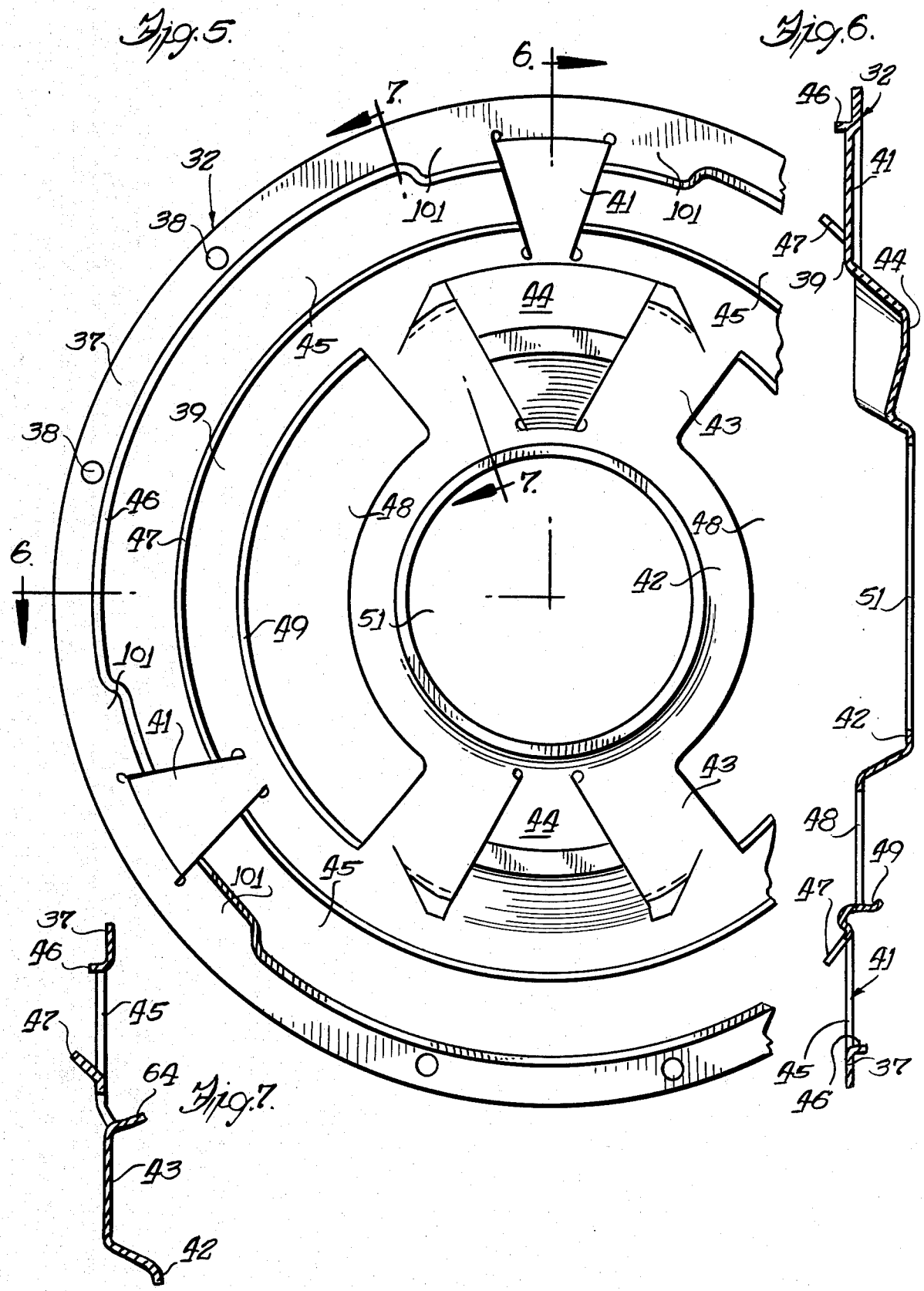

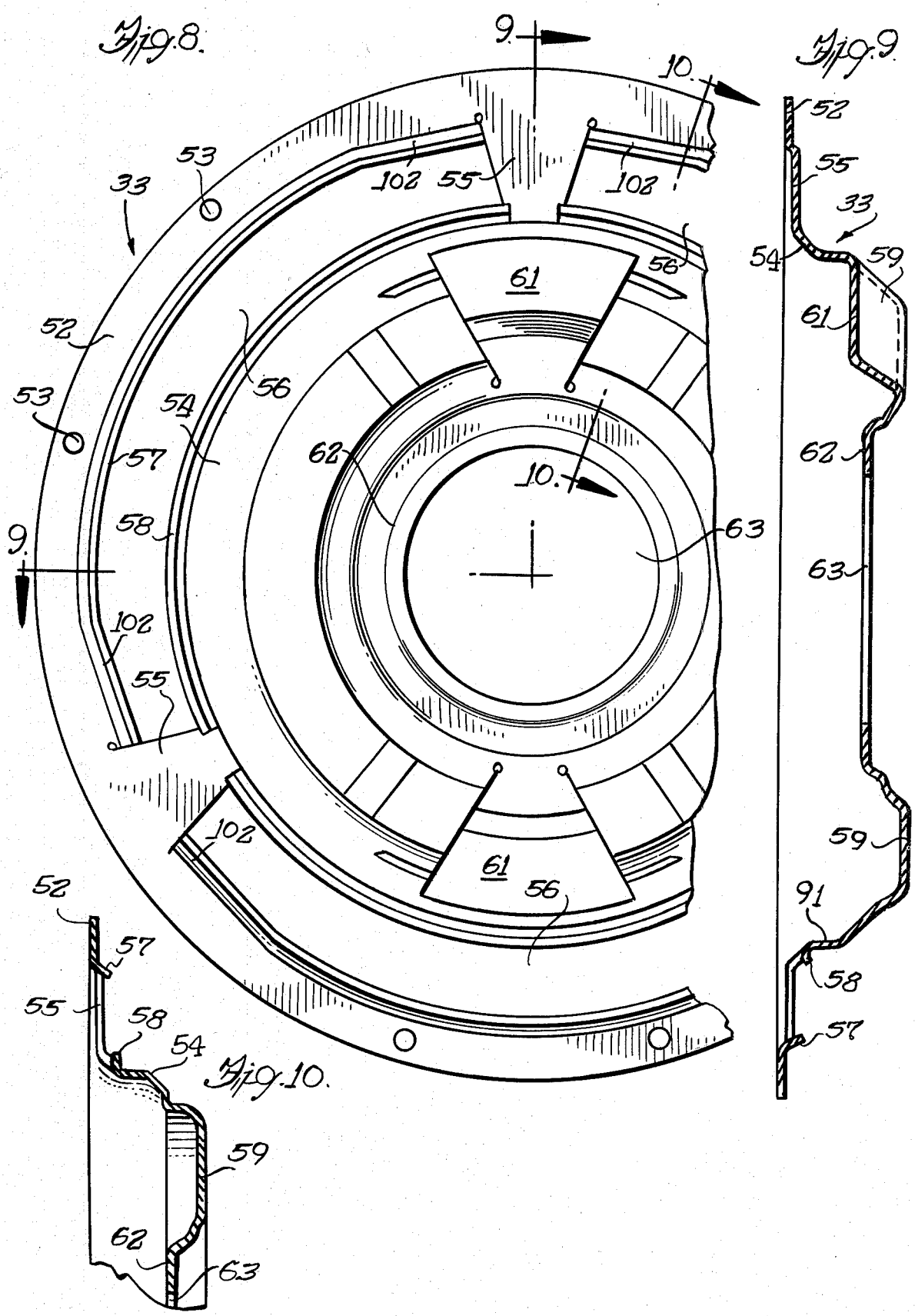

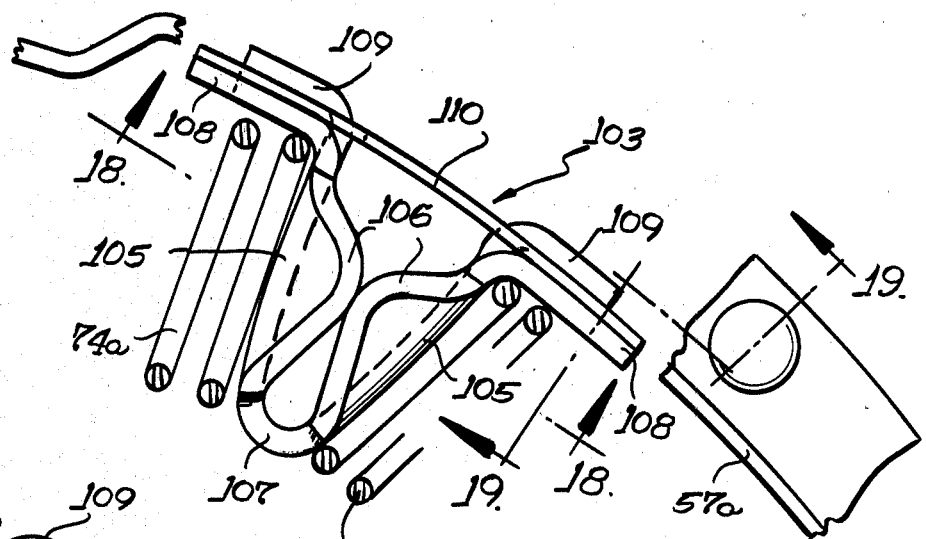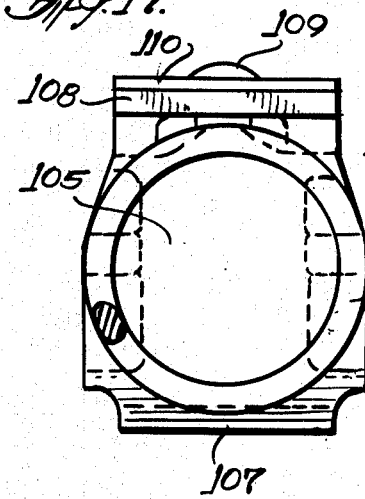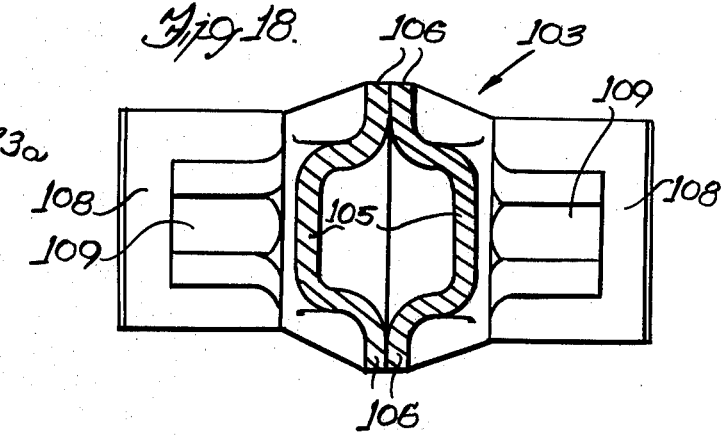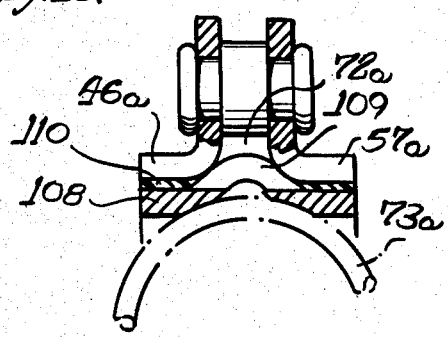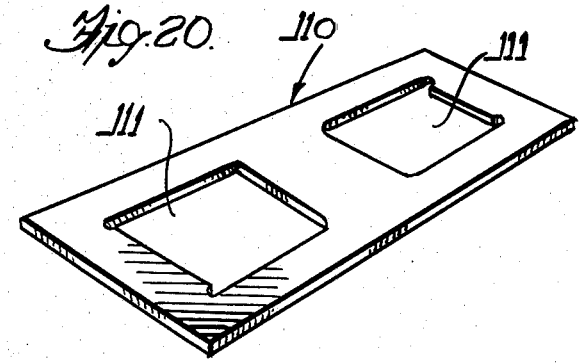

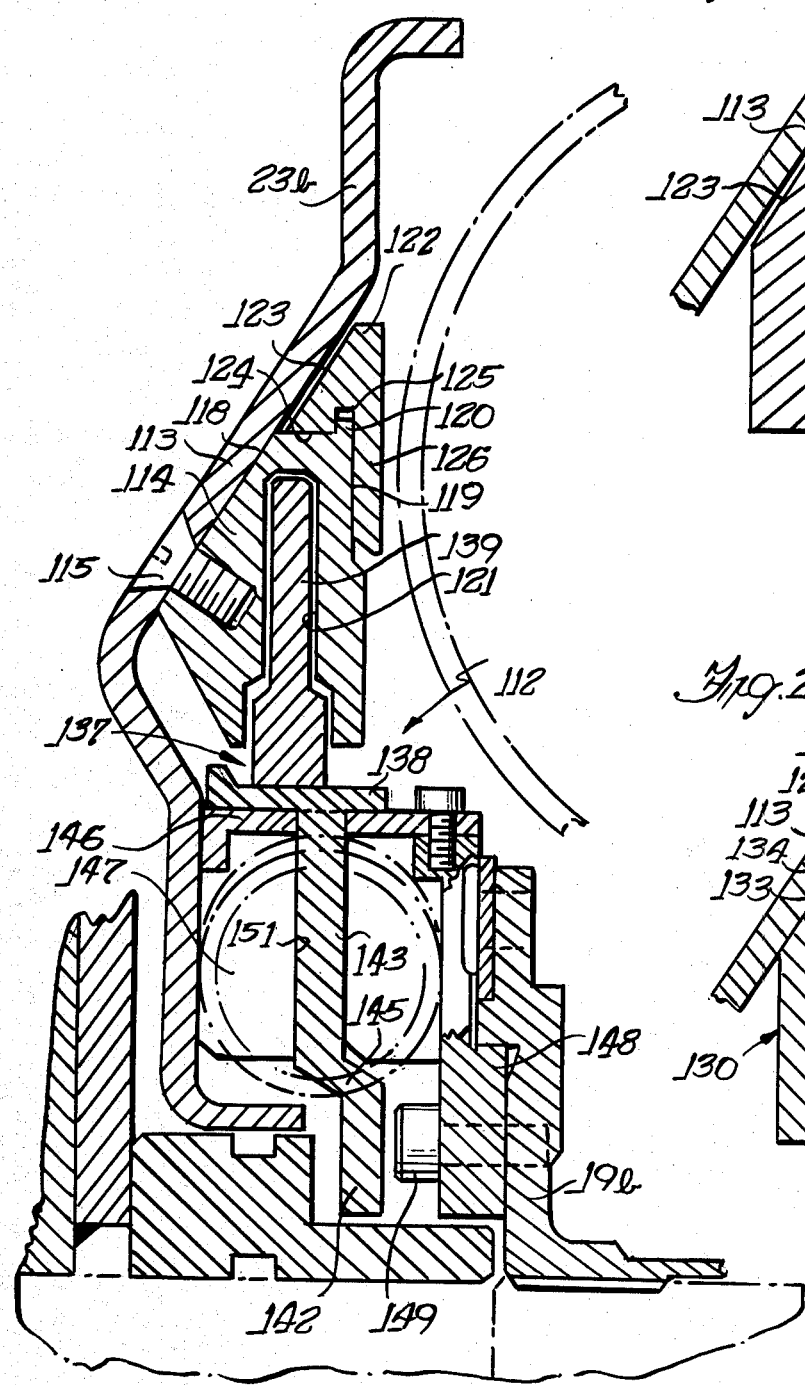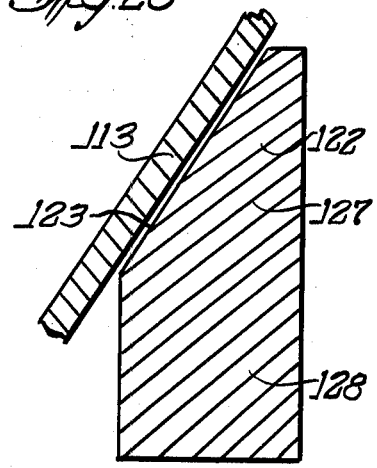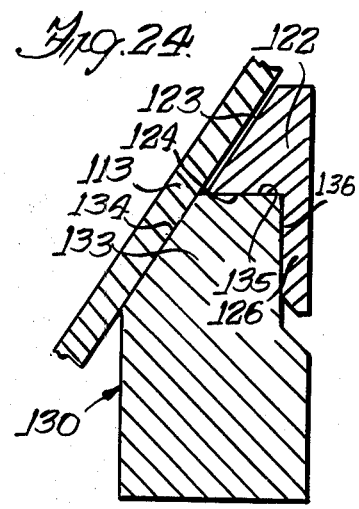

TWO-STAGE TORSIONAL VIBRATION DAMPER

This is a continuation of application Ser. No. 106,597 filed Dec. 26, 1979, now abandoned.

BACKGROUND OF THE INVENTION

A torsional vibration damper is conventionally utilized in a clutch assembly for the drive train of a manual transmission of an automotive vehicle to neutralize any torsional vibrations emanating from the vehicle engine which would otherwise cause undesirable characteristics; e.g. impact loads, pulsations, noises, etc., in the transmission and driveline during vehicle operation. Also, a hydraulic torque converter or fluid coupling for an automatic transmission having a lock-up clutch to enhance fuel economy through a direct drive between the fluid coupling inlet and outlet in high gear necessitates a vibration damper. However, earlier vibration dampers were limited in their utility because of the relatively short arc of relative travel between the driving and driven members of the damper in the clutch.

To overcome these deficiencies, a vibration damper having a longer path of travel was substituted for the conventional short arc damper. Such dampers, as shown in the copending applications Ser. No. 801,989 filed May 31, 1977; Ser. No. 860,348 filed Dec. 14, 1977; and Ser. No. 45,711 filed June 5, 1979, and U.S. Pat. No. 4,139,995, provided an extended path of travel, especially in a lock-up clutch for a torque converter. However, conditions arose where an even longer path of travel for a vibration damper was required, and the present invention provides this longer travel path.

SUMMARY OF THE INVENTION

The present invention relates to a two-stage torsional vibration damper assembly which can be used in a lock-up clutch for a torque converter and is capable of greater relative movement between the driving and driven members of the damper than previously obtainable. The greater the arc of relative movement between the driving and driven members, the lower the damper rate. Under certain conditions of operation of a vehicle engine and transmission, a damper rate is desired that is lower than the lowest rate obtainable in the above noted dampers, and this lower rate is achievable with the present two-stage damper arrangement.

The present invention also relates to a torsional vibration damper assembly which, because of its very low damper rate, enhances the hydraulic damping inherent in a hydraulic torque converter for the vehicle. Without a lock-up clutch, the torque converter acts to hydraulically damp out undersirable vibrations, resonance, etc., however, a separate damper is required with the addition of the lock-up clutch. The present extended travel damper provides a sufficiently low damper rate to allow the hydraulic damping of the torque converter to be effective and enhance the effectiveness of the vibration damper.

The present invention further relates to a novel two-stage torsional vibration damper assembly having two concentric circles of damper springs arranged in a housing and driven by drive tangs mounted on a driving member, such as a piston plate for the lock-up clutch. Floating members separate the springs in both the inner and outer circles of springs, and two or more groups of springs in each circle are operated in parallel, with the springs in each group acting in series.

The present invention also comprehends the provision of a novel two-stage torsional vibration damper assembly having concentric circles of springs, with the springs in the outer circle being driven by drive tangs and separated within the spring groups by floating divider rings having divider arms between the adjacent springs. In the inner circle of springs driven by strap members on the retainer housing, floating wedges or skates movable in the retainer housing separate adjacent springs. The inner spring groups ultimately drive the arms of a hub member operatively connected to the input shaft for the vehicle transmission.

The present invention further comprehends the provision of a two-stage torsional vibration damper assembly having concentric circles of springs arranged in two or more groups, where the springs within each group are separated by floating wedges or skates.

Another feature of the present invention is the provision of a two-stage torsional vibration damper assembly which provides a low damper rate with a maximum arc of relative movement between the driving and driven members of 90°. The arrangement has an outer circle of springs arranged into three groups operating in parallel with three spring sets in each group and an inner circle of springs arranged into two parallel groups with three spring sets in each group.

Further objects are to provide a construction of maximum simplicity, efficiency, economy and ease of assembly and operation, and such further objects, advantages and capabilities as will later more fully appear and are inherently possessed thereby.

DESCRIPTION OF THE DRAWINGS

FIG. 2 is an enlarged cross sectional view of the damper assembly taken on the irregular line 2—2 of FIG. 1 in a torque converter assembly.

FIG. 3 is an enlarged partial cross sectional view taken on the line 3—3 of FIG. 1.

FIG. 4 is an enlarged partial cross sectional view taken on the line 4—4 of FIG. 1.

FIG. 5 is a rear elevation view of the front retainer plate for the assembly.

FIG. 6 is a cross sectional view of the front retainer plate taken on the irregular line 6—6 of FIG. 5.

FIG. 7 is a partial cross sectional view taken on the line 7—7 of FIG. 5.

FIG. 8 is a rear elevational view of the rear retainer plate.

FIG. 9 is a cross sectional view of the rear retainer plate taken on the irregular line 9—9 of FIG. 8.

FIG. 10 is a partial cross sectional view taken on the line 10—10 of FIG. 8.

FIG. 16 is a side elevational view of the outer sliding divider.

FIG. 17 is an end elevational view of the outer sliding divider.

FIG. 18 is a horizontal cross sectional view of the divider taken on the line 18—18 of FIG. 16.

FIG. 19 is a partial cross sectional view taken on the irregular line 19—19 of FIG. 16.

FIG. 20 is a perspective view of a wear plate for the divider.

FIG. 22 is a cross sectional view of the damper assembly taken on the line 22—22 of FIG. 21.

FIG. 23 is a partial cross sectional view taken on the line 23—23 of FIG. 21.

FIG. 24 is a partial cross sectional view taken on the line 24—24 of FIG. 21.

DESCRIPTION OF THE PREFERRED EMBODIMENTS

Figure 1:
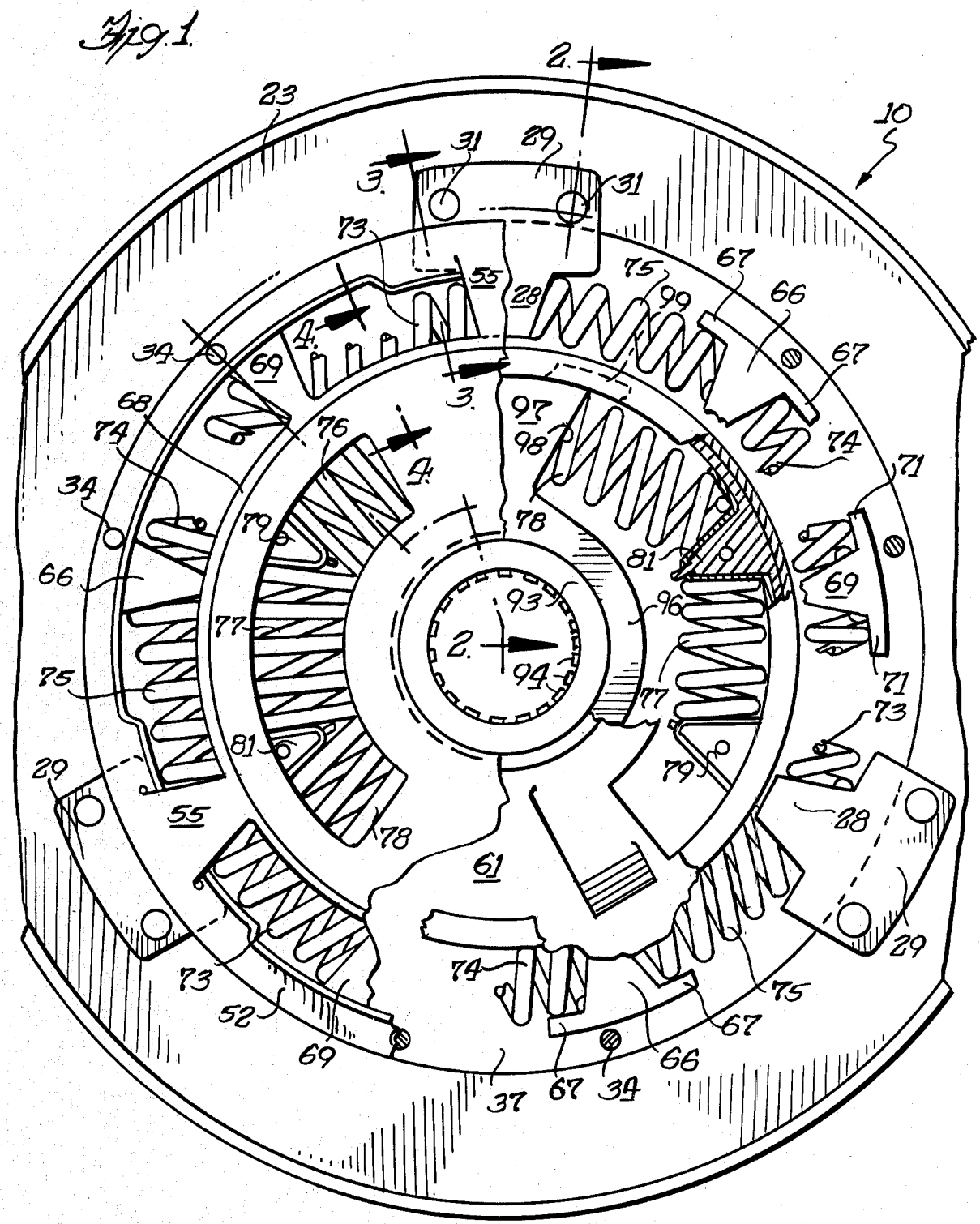
FIG. 1 is a rear elevational view with parts broken away of the two-stage vibration damper assembly.
Figure 13:
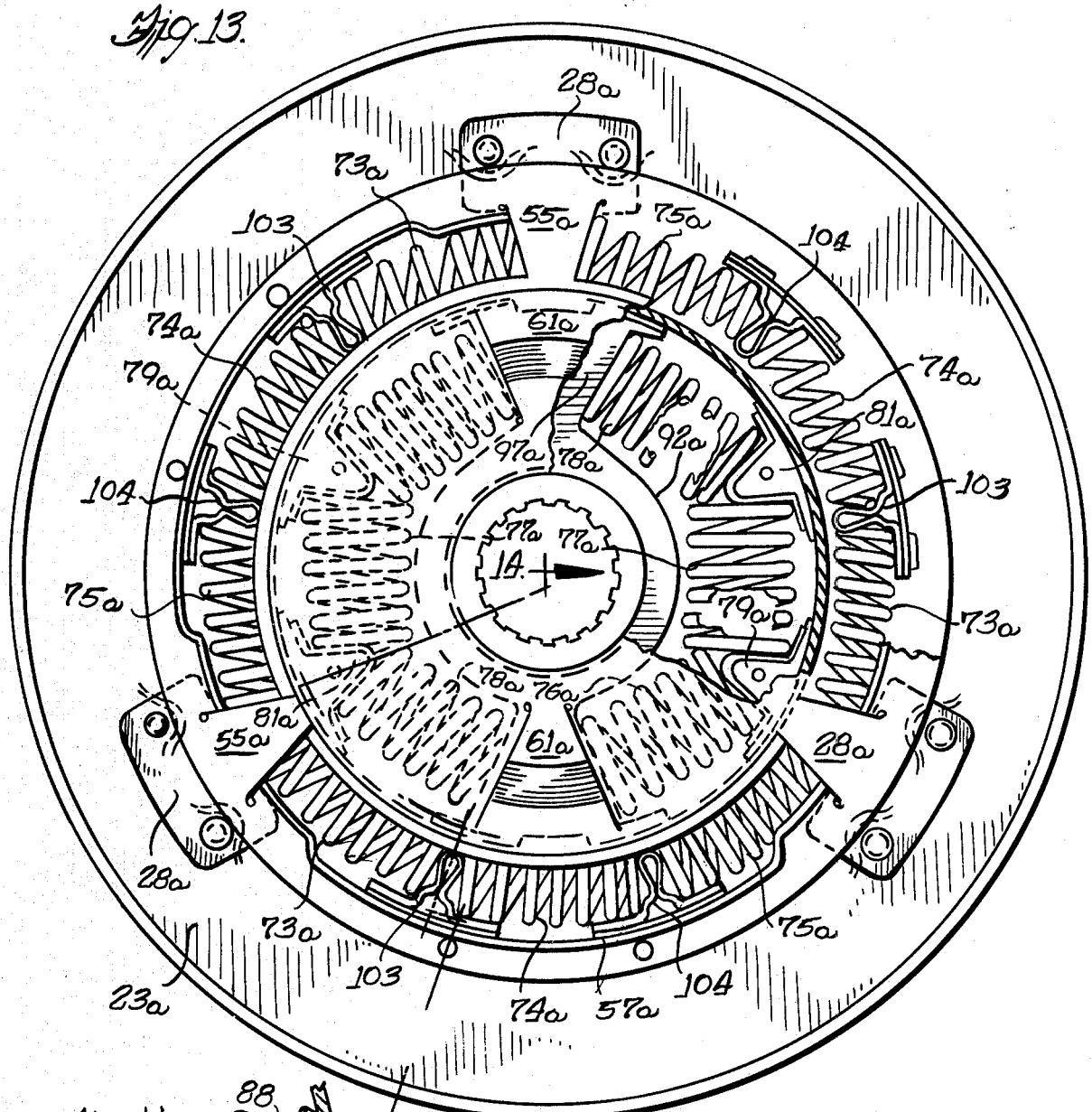
FIG. 13 is a rear elevational view with portions broken away of a second embodiment of two-stage vibration damper assembly.
Figure 11:
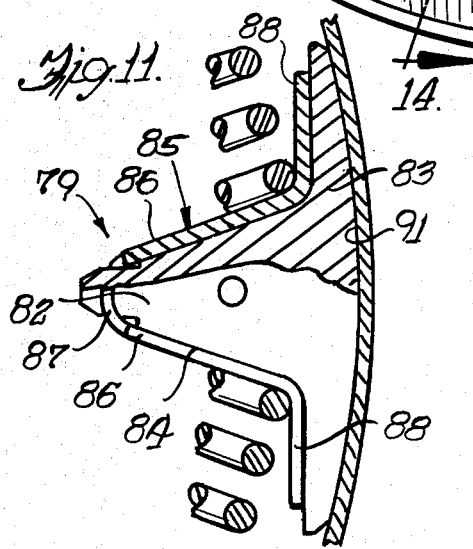
FIG. 11 is a side elevational view partially in cross section of the inner sliding divider in operative position.
Figure 15:
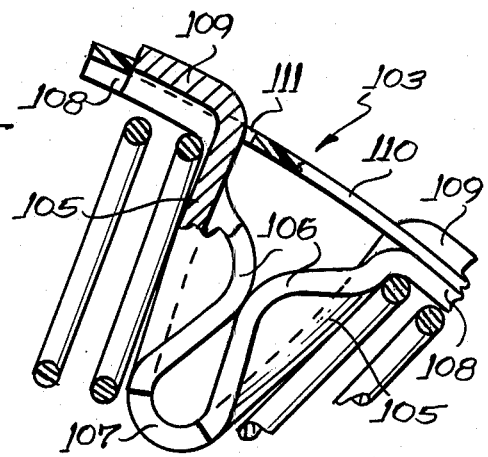
FIG. 15 is a side elevational view partially in cross section of an outer sliding divider in operative position.
Figure 12:
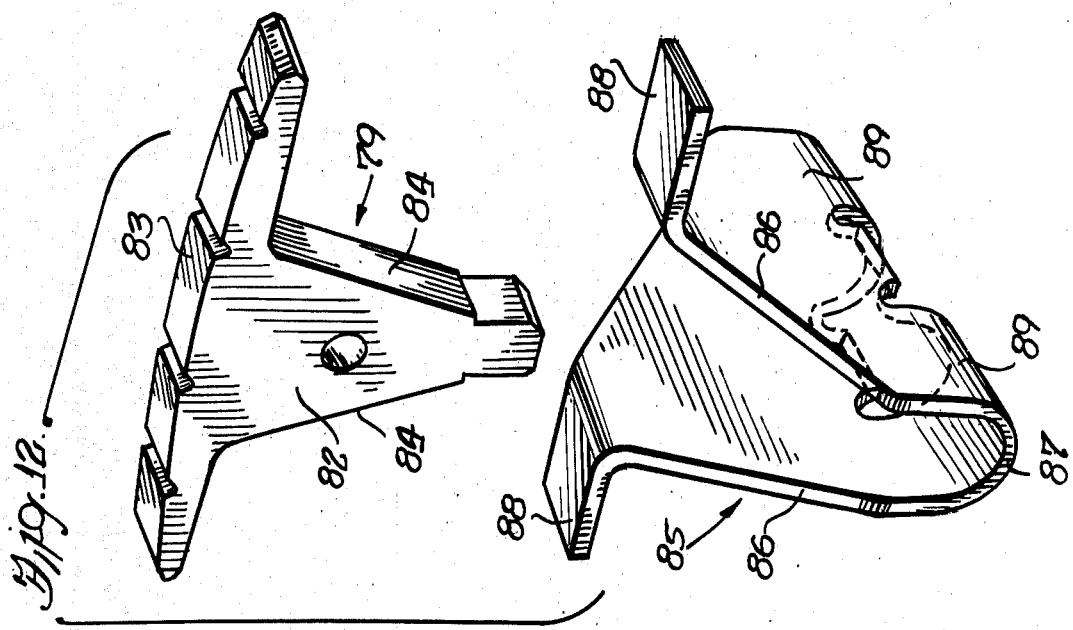
FIG. 12 is an enlarged exploded perspective view of an inner sliding divider.
Figure 14:
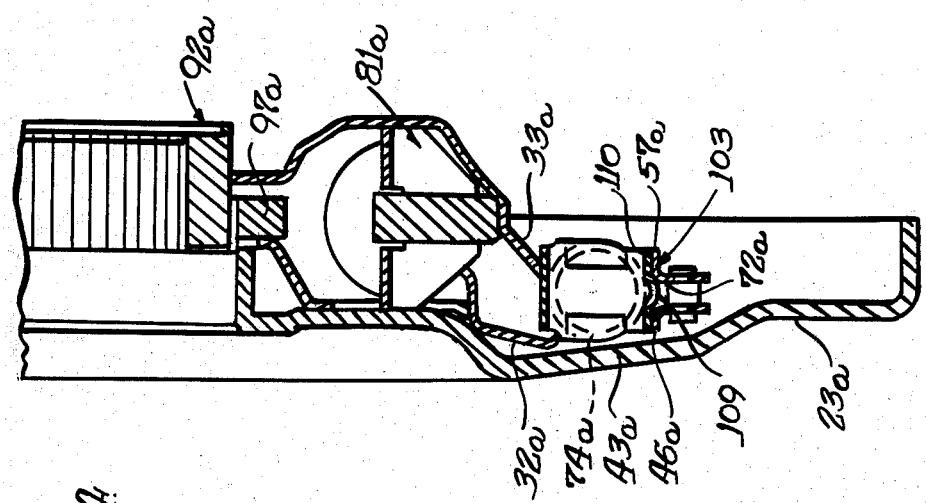
FIG. 14 is a partial cross sectional view of the assembly taken on the irregular line 14—14 of FIG. 13.
Figure 21:
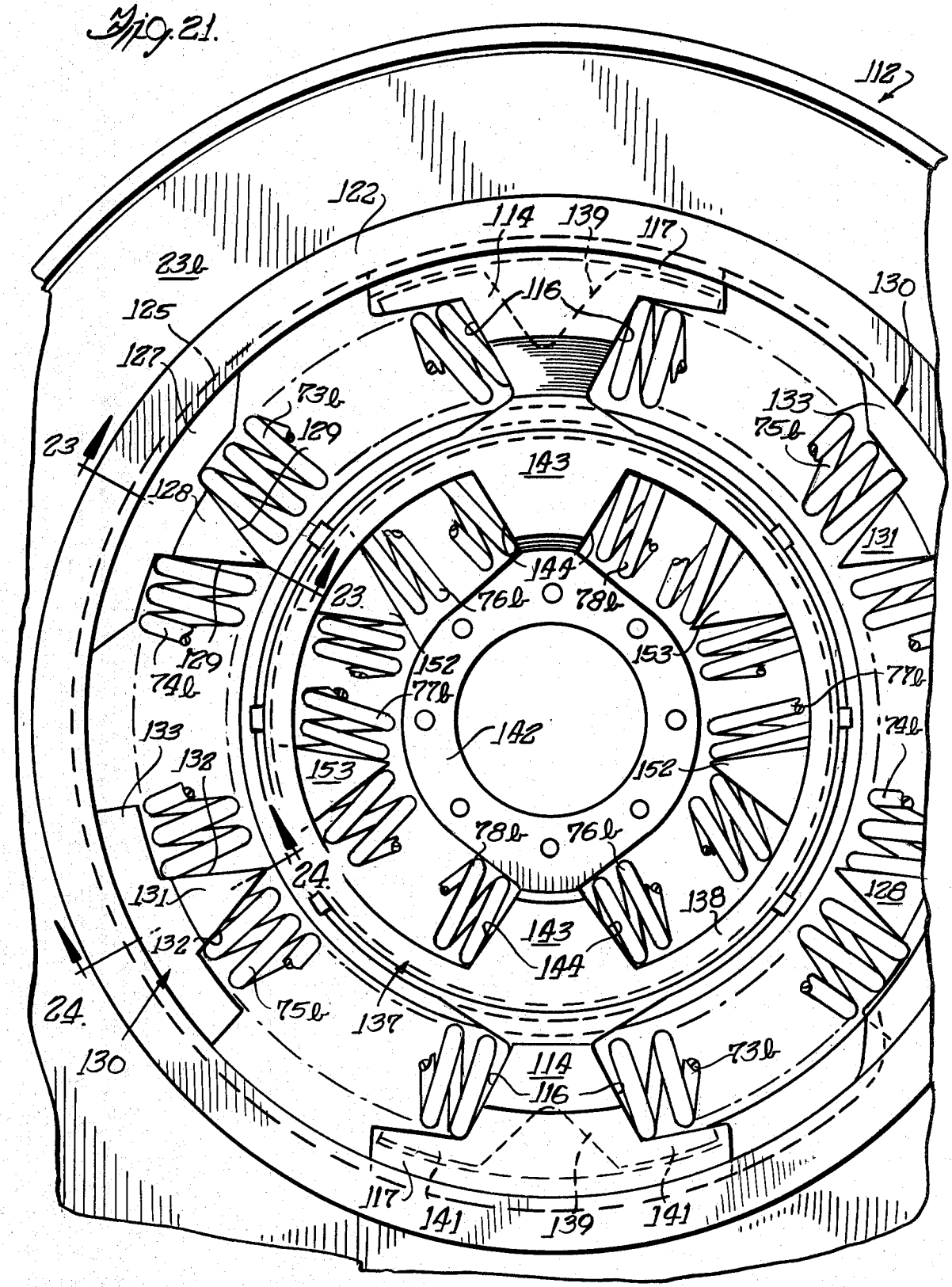
FIG. 21 is a rear elevational view with portions broken away of a third embodiment of two-stage vibration damper assembly.

Referring more particularly to the disclosure in the drawings wherein are shown illustrative embodiments of the present invention, FIGS. 1 and 2 disclose a two-stage torsional vibration damper assembly 10 utilized in a lock-up clutch 11 for a torque converter 12. The torque converter includes a housing 13 driven by the output shaft of an engine (not shown) having a front cover 14 with an annular clutch surface 15 formed on the interior surface thereof and a rear cover 16 operatively connected to an impeller (not shown). A turbine 17 is located in the forward portion of the housing and is secured at its inner periphery 18 to a turbine hub 19 having interior splines 21 to receive the splined end of a transmission input shaft 22. A stator (not shown) is also appropriately positioned in the housing.

An axially movable piston plate 23 has an annular friction surface 24 adjacent the outer periphery cooperating with the surface 15, forming the lock-up clutch 11, and an inner annular flange 25 slidably mounted on a bearing 26 and sealed by an annular ring seal 27 mounted in a groove in the bearing. Both the piston plate 23 and the damper assembly 10 are located in the space between the front cover 14 and the shell of the turbine 17.

The vibration damper assembly 10 includes three circumferentially spaced drive tangs 28 secured at their bases 29 to the piston plate 23 by two or more rivets 31, with the tangs extending radially inwardly into a housing formed by a front retainer plate 32 and a rear retainer plate 33. To allow the tangs to move relative to the housing, the substantially parallel peripheral flanges 37,52 of the plates 32,33 are secured together at a plurality of points around the circumference by stop pins 34; each pin having a central enlarged portion 35 acting as a spacer between the flanges with the ends 36 of the pins projecting through the openings 38,53 in the flanges and upset. Thus, the flanges are spaced apart by the portions 35 to allow the tangs to extend into and move relative to the housing.

The front retainer plate 32 is circular with an irregular shape in cross section, as seen in FIGS. 5, 6 and 7, and has an annular peripheral flange 37 provided with openings 38 for the rivets or stop pins 34, an intermediate body portion 39 joined to the peripheral flange by three outer drive members 41, and an inner peripheral portion 42 which is generally conical and is connected to the intermediate portion 39 by a pair of oppositely disposed connecting arms 43,43; each connecting arm having an inwardly offset central inner drive strap 44.

The outer drive members 41, in conjunction with the peripheral flange 37 and the intermediate portion 39, define three elongated arcuate slots or openings 45 for the groups of outer damper springs 73,74 and 75; each opening being further defined by an outer arcuate lip 46 on the flange 37 and an inner arcuate lip 47 on the intermediate portion 39. Likewise, the connecting arms 43 in conjunction with the intermediate portion 39 and the inner portion 42 define a pair of elongated arcuate slots or openings 48 for the groups of inner damper springs 76, 77 and 78; with the intermediate portion 39 having a spring retaining lip 49 extending in the opposite direction to the lip 47. The inner periphery 42 inwardly converges to a central opening 51.

The rear retainer plate 33 includes a peripheral flange 52 having circumferentially spaced openings 53 to receive the stop pins 34 and a central body portion 54 joined to the peripheral flange by three circumferentially equally spaced drive members 55. The drive members define three arcuate slots or openings 56 generally axially aligned with the slots 45 and having outer lips 57 on the flange 52 and inner lips 58 on the body portion 54. The central body portion 54 is rearwardly bulged to provide enclosed pockets 59 for the damper springs 76, 77 and 78 and has a pair of inwardly offset oppositely disposed inner drive straps 61. The body portion terminates in an inwardly extending radial flange 62 defining a central opening 63 generally axially aligned with the opening 51 in the front plate 32.

Journalled on a rearwardly extending annular flange 64 of the front retainer plate 32 are a pair of divider rings 65 and 68; the ring 65 having three circumferentially equally spaced slightly rearwardly offset separator arms 66 extending radially outwardly and terminating in circumferentially extending fingers 67. Likewise, the ring 68 has three circumferentially equally spaced slightly forwardly offset separator arms 69 extending radially outwardly to terminate in circumferentially extending fingers 71. The arms 66 and 69 are oppositely offset so that they and their respective fingers 67 and 71 extend into a guide channel 72 formed between the peripheral flanges 37 and 52 and the outer lips 46 and 57 on the front and rear plates, respectively.

Located between the outer drive members 41 and 55 on the plates 32 and 33 and the arms 66 and 69 of the rings 65 and 68 are three groups of damper springs 73, 74 and 75 operating in parallel, with the springs in each group operating in series. Similarly, two groups of damper springs 76, 77 and 78 operating in parallel are positioned in the inner spring pockets 59 between the drive straps 44 and 61 and pairs of sliding dividers 79 and 81. Each divider includes a tapered body portion 82 terminating at the wide end in an arcuate sliding portion 83 extending circumferentially from both diverging edges 84,84 of the body portion. A divider clip 85 has a pair of outwardly diverging sides 86,86 joined by a rounded connecting portion 87 fitting onto the tapered body portion 82 of each divider; the arms terminating in outwardly extending flanges 88 engaging the inner surfaces of the arcuate sliding portion 83. The sides 86,86 extend outwardly at 89 beyond the width of the tapered body portion so as to be engaged by the damper springs 76, 77, 78. The sliding portions 83 of the dividers engage a guide surface 91 formed on the central body portion 54 of plate 33, and the extended sides 89 conformably fit within the spring pockets 59 between the plates.

A hub assembly 92 includes a hub barrel 93 with internal splines 94 interconnecting with external splines 95 formed on the turbine hub 19 and a hub plate or flange 96 staked onto the barrel and extending between the plates 32 and 33 at their inner peripheries. The flange 96 includes a pair of diametrically oppositely disposed hub arms 97,97 extending between and generally axially aligned with the pairs of drive straps 44 and 61; the arms having outwardly diverging edges 98 and terminating in circumferentially oppositely extending fingers 99. Thus, the hub arms 97 are in the path of the inner damper springs 76, 77 and 78. Also, the radial flange 62 of the rear plate 33 is journalled on the hub barrel 93.

The outer arcuate lips 46 and 57 on the plates 32 and 33 have re-entry ramps 101 and 102, respectively, formed adjacent the drive members 41 and 55 and act both as retainers for the springs 73 and 75 and as inclined planes to prevent outward movement of the springs as the drive tangs 28 are moved away from the members 41,55 during the damping operation.

During operation of the torque converter 12, the oil flowing in the vanes of the impeller, turbine and stator also fills the torque converter housing 13 and, as the oil pressure increases with increasing speed of rotation of the turbine 17, the oil pressure gradually urges the piston plate 23 and the connected damper assembly 10 to the left as seen in FIG. 2 to cause the friction surface of the piston plate to engage the surface 15 of the front cover 14 to lock the impeller and turbine of the torque converter into a direct drive arrangement. Assuming that the piston plate is rotated in the counterclockwise direction as seen in FIG. 1, the piston plate 23 and the drive tangs 28 begin to rotate as the clutch surfaces engage relative to the stationary damper housing.

As the drive tangs move between the flanges 37,52 of the retainer plates 32,33, they engage the damper springs 73 to compress the springs. The springs 73 urge the rear divider ring 68 through the arms 69 to compress springs 74; which springs in turn urge the arms 66 of front divider ring 65 to compress the springs 75. These springs in turn act upon the outer drive members 41,55 of the plates 32,33 to rotate the plates relative to the hub assembly 92. Rotation of the plates 32 and 33 causes the inner drive straps 44,61 to compress the pair of springs 76, and these springs engage and move the sliding dividers 79 to compress the springs 77; the springs 77 moving the sliding dividers 81 to compress springs 78. Compression of springs 78 urges the arms 97 of the hub assembly 92 to rotate the hub barrel 93 and the turbine hub 19 to result in rotation of the transmission input shaft 22. Thus, the assembly damps any vibration, noises, etc. in the drive train with an arrangement utilizing three groups of outer springs 73, 74, 75 in parallel and two groups of inner springs 76, 77, 78 in parallel; the springs in each group acting in series.

FIGS. 13 through 20 disclose a second embodiment of two-stage vibration damper similar to that shown in FIGS. 1-12 with like parts having the same reference numerals with a subscript a. This embodiment utilizes a second series of sliding dividers 103 and 104 in place of the front and rear divider rings 65 and 68 shown in FIGS. 1-12. These dividers slide on the outer lips 46a and 57a of the front retainer plate 32a and rear retainer plate 33a, respectively. The dividers 103 and 104 are identical and are formed of stamped sheet metal with outwardly diverging sides 105 having inwardly crimped edges 106 and joined by a rounded inner end 107; the sides terminating at their outer ends in circumferentially extending flanges 108 having upwardly stamped locating tabs 109 which are received in openings 111 of a generally rectangular wear plate 110 resting on the flanges 108. The wear plate 110 engages the outwardly extending lips 46a and 57a on the retainer plates with the tabs 109 received in the guide channel 72a between the flanges 37a and 52a to guide movement of the dividers.

In operation, upon rotation of the piston plate 23a, the drive tangs 28a move relative to the retainer plates 32a and 33a to engage the springs 73a. Compression of these springs urge the springs against the sliding dividers 103 to compress springs 74a, which in turn urge the sliding dividers 104 against the springs 75a. Compression of springs 75a cause the drive members 41a,55a to rotate the retainer plates 32a,33a, resulting in rotation of drive straps 44a,61a against inner springs 76a. Compression of springs 76a urge the dividers 79a to compress springs 77a, which in turn urges the dividers 81a to compress springs 78a, with these springs engaging the hub arms 97a to rotate the hub assembly 92a resulting in rotation of the transmission input shaft.

FIGS. 21 through 24 disclose a third embodiment of two-stage damper assembly 112 similar to that of FIGS. 1-12, wherein like parts have the same reference numeral with the addition of a script b. The piston plate 23b is substantially the same as shown in FIG. 2 except for an inclined portion 113 on which a pair of oppositely disposed drive tangs 114 are secured by screws 115 or similar securing means. Each drive tang has a tapered body portion with outwardly diverging spring engaging surfaces 116 terminating in an arcuate base portion 117, the tang having an inclined surface 118 abutting the piston plate, an opposite substantially vertical surface 119 and an upwardly extending guide flange 120. Also, a circumferentially extending slot 121 extends through the tapered body portion and into the base portion.

Journalled on the drive tangs is a divider ring 122 (FIGS. 22, 23 and 24) having an inclined surface 123 abutting the piston plate 23b, a flat underside 124 with an annular groove 125 receiving the guide flanges 120 and a depending inner flange 126 paralleling the generally vertical surface 117 of the tangs. At oppositely disposed positions, the ring has a pair of inwardly extending thicker portions 127, each portion terminating in a tapered divider 128 having inwardly converging spring engaging surfaces 129. A pair of sliding dividers 130 (FIGS. 21 and 24) are mounted to slide in the channel formed by the ring 122; each divider including a tapered body portion 131 with outwardly converging spring engaging surfaces 132 and an arcuate base portion 133 having an inclined surface 134 engaging the inclined portion 113 of the piston plate, an arcuate surface 135 journalled in the underside 124 of the ring 122 and a flat surface 136 slidably engaging the interior surface of the depending flange 126.

An intermediate member 137 comprises an outer ring 138 having a pair of oppositely disposed arms 139 (FIG. 22) with outwardly diverging spring engaging edges terminating in circumferentially extending fingers 141, and an inner ring 142 joined to the outer ring by a pair of oppositely disposed drive straps 143 having outwardly diverging spring engaging edges 144; the straps being joined to the inner ring by offset portions 145.

An inner drive ring or hub 146 (FIG. 22) includes an annular ring with a pair of oppositely disposed inwardly extending drive tabs 147 with inwardly converging spring engaging surfaces, and a rearwardly located inwardly extending annular hub flange 148 being suitably secured, as by bolts 149, to the turbine hub 19b of the torque converter. The ring 146 and tabs 147 have elongated circumferentially extending slots 151 receiving the drive straps 143 for relative rotation between the intermediate member 137 and drive ring 146. Slidably mounted on the ring 146 are two pairs of dividers 152,153 having inwardly converging spring engaging surfaces to separate the inner damping springs 76b, 77b and 78b. The dividers 128 of the ring 122 and sliding dividers 130 separate the outer damping springs 73b, 74b and 75b.

As seen in FIG. 16, there are two groups of damper springs 73b, 74b, 75b acting in parallel and two groups of inner damper springs 76b, 77b, 78b acting in parallel. Considering the operation of this embodiment, rotation of the piston plate 23b causes the drive tangs 114 to move compressing the springs 73b, which act on the dividers 128 of the ring 122 to compress springs 74b, which in turn act on sliding dividers 130 to compress springs 75b; the springs 75b acting on the arms 139 to cause rotation of the intermediate member 137 relative to the drive ring or hub 146. Movement of the arms causes rotation of the drive straps 143 to compress springs 76b, which causes sliding movement of dividers 152 to compress springs 77b, which results in movement of dividers 153 to compress springs 78b, and in turn causes rotation of the tabs 147 of inner drive ring or hub 146 to rotate the turbine hub 19b. Thus, a damping action of up to a maximum of 90° is achieved by these damper embodiments.

I claim:

1. A two-stage torsional vibration damper assembly for the transmission of torque between driving and driven elements, comprising a piston plate operatively associated with torque input means, at least two drive tangs secured to said piston plate, a hub operatively connected to an output shaft, at least two outer floating means adapted to move in an arcuate path about the hub, at least two inner floating means adapted to move in a second arcuate path about the hub concentric to the first arcuate path, a plurality of outer damper springs movable in said first arcuate path, a plurality of inner damper springs movable in said second arcuate path, said drive tangs having projections extending inward into said first arcuate path, and an intermediate rotatable member having at least two drive members extending into said first arcuate path and at least two drive straps extending into said second arcuate path, said hub having at least two arms extending into said second arcuate path, said outer damper springs being interposed between said outer floating means and said drive members, and said inner damper springs being interposed between said drive straps and said second floating means.

2. A torsional vibration damper assembly as set forth in claim 1, in which said outer damper springs include three groups of three springs acting in parallel and said inner damper springs include two groups of three springs acting in parallel, three drive tangs separating said three outer spring groups, said outer floating means comprising a pair of divider rings, each said divider ring having three circumferentially equally spaced outwardly extending arms, said intermediate member including a pair of retainer plates each having three drive members and two drive straps integral therewith, said inner floating means comprising two pair of sliding dividers, and said hub having a pair of oppositely disposed outwardly extending hub arms.

3. A torsional vibration damper assembly as set forth in claim 2, in which said drive tangs extend between said retainer plates and between said drive members, and said hub arms extend between said drive straps, said arms on said divider rings being offset from said respective ring so as to lie in a common plane, said rings being journalled on and said dividers being slidable on at least one of said retainer plates, said retainer plates having outer arcuate slots separated by said drive members and inner arcuate spring pockets to receive said outer and inner damper springs, said drive straps being inwardly offset in said pockets, at least one retainer plate being journalled on said hub, said drive tangs being axially aligned with said drive members and said hub arms being axially aligned with said drive straps in the absence of applied torque by the input means.

4. A torsional vibration damper assembly as set forth in claim 3, in which each retainer plate has a peripheral radial flange, and a plurality of stop pins having enlarged spacing means joining the flanges together with a space therebetween, said drive tangs projecting through the spacing between the flanges into the first arcuate path.

5. A torsional vibration damper assembly as set forth in claim 1, wherein said drive tangs are axially aligned with said drive members and said hub arms are axially aligned with said drive straps in the absence of applied torque by the input means.

6. A torsional vibration damper assembly as set forth in claim 5, in which said intermediate member comprises a pair of irregularly shaped retainer plates connected together in spaced relation, said drive members and drive straps being formed integral with said plates.

7. A torsional vibration damper assembly as set forth in claim 6, in which said retainer plates have peripheral radial flanges spaced apart to receive said drive tangs therebetween projecting into said outer arcuate path of the outer damper springs, at least one retainer plate being journalled on said hub.

8. A torsional vibration damper assembly as set forth in claim 7, in which said retainer plates have outer arcuate slots separated by said drive members to receive said outer damper springs and inner arcuate spring pockets receiving said inner damper springs, said drive straps being inwardly offset in said pockets to extend into the path of said inner damper springs.

9. A torsional vibration damper assembly as set forth in claim 8, wherein said hub arms extend radially outwardly from a hub barrel into the second arcuate path and between said inwardly offset drive straps.

10. A torsional vibration damper assembly as set forth in claim 5, in which said outer floating means includes a pair of divider rings journalled on said intermediate member adjacent each other, each divider ring having at least two outwardly extending arms separating said outer damper springs, said divider ring arms being partially inwardly offset towards the adjacent ring to be positioned in a common plane.

11. A torsional vibration damper assembly as set forth in claim 5, in which said inner floating means comprises two pairs of sliding dividers separating said inner damper springs, said dividers sliding on said intermediate member.

12. A torsional vibration damper assembly as set forth in claim 5, wherein said outer floating means includes at least two pairs of sliding dividers slidable on said intermediate member and separating said outer damper springs.

13. A torsional vibration damper assembly as set forth in claim 12, wherein said inner floating means comprises two pairs of sliding dividers separating said inner damper springs, and said intermediate member including a pair of irregularly shaped retainer plates having peripheral radial flanges connected together in spaced relation, said drive members and drive straps being integral therewith, at least one retainer plate being journalled on said hub.

14. A torsional vibration damper assembly as set forth in claim 13, wherein said retainer plates have outer arcuate slots separated by said drive members to accommodate said outer damper springs and inner arcuate spring pockets divided by said drive straps inwardly offset into said pockets, and said hub arms extend outwardly between said drive straps.

15. A torsional vibration damper assembly as set forth in claim 14, in which three circumferentially equally spaced drive tangs are secured to said piston plate, and three pairs of outer sliding dividers are positioned between said retainer plates to separate said outer damper springs, said retainer plates have three circumferentially equally spaced drive members and a pair of oppositely disposed drive straps, said hub has a pair of oppositely disposed outwardly extending hub arms, three groups of outer spring sets acting in parallel with three springs in each group, and two groups of inner spring sets acting in parallel with three springs in each group.

16. A torsional vibration damper assembly as set forth in claim 5, including a pair of oppositely disposed drive tangs having circumferential slots therein, said hub having an annular flange secured to said output means and terminating at its outer periphery in a ring, a pair of oppositely disposed hub arms extending radially inwardly from said ring, and said intermediate member includes a central ring concentric with said hub ring and an inner ring connected to said central ring by said drive straps, said drive members extending outwardly from said central ring into said slots in the drive tangs.

17. A torsional vibration damper assembly as set forth in claim 16, wherein said hub ring and arms have oppositely disposed elongated slots therein receiving said drive straps, and said drive tangs include outer circumferential guide flanges formed thereon.

18. A torsional vibration damper assembly as set forth in claim 17, in which said outer floating means includes a divider ring having a depending flange and an annular guide slot receiving said guide flanges, and a pair of oppositely disposed inwardly extending spring dividers integral therewith and projecting into said outer arcuate path, and a pair of opposite disposed sliding dividers, said ring having a guide surface for said sliding dividers.

19. A torsional vibration damper assembly as set forth in claim 18, including two pair of sliding dividers movable on the interior surface of said hub ring.

20. A torsional vibration damper assembly as set forth in claim 19, in which two groups of outer springs operate in parallel with three springs in each group, and two groups of inner spring sets operate in parallel with three springs in each group.

* * * * *